United States Patent Office 3,227,726
Patented Jan. 4, 1966

3,227,726
PREPARATION OF BENZOTRIAZOLE
Joseph Levy, Paramus, N.J., assignor to Universal Oil Products Company, Des Plaines, Ill., a corporation of Delaware
No Drawing. Filed Dec. 21, 1964, Ser. No. 420,155
6 Claims. (Cl. 260—308)

This application is a continuation-in-part of copending application Serial No. 271,574, filed April 9, 1963, and now abandoned.

This invention is concerned with an improved process for the preparation of 1,2,3-benzotriazole.

1,2,3-benzotriazole is a valuable compound which finds a wide variety of applications in the chemical field among which are uses as an anti-corrosion agent in synthetic detergents, antifreezes, lubricants and varnishes or as an intermediate in the preparation of dyes, fungicides, or plant growth regulators, and as a polymerization catalyst.

The prior art has disclosed that 1,2,3-benzotriazole, hereinafter referred to as merely benzotriazole, has been prepared by the reaction of nitrous acid and o-phenylenediamine in essentially a two-step procedure involving first a diazotization conducted at low temperature in the range of from about 0° to 5° C., according to the usual practice in such reactions in order to minimize side reactions, followed by a cyclization of the diazonium salt thus formed at higher temperatures up to about 80° C. Such a preparational procedure present difficulties for industrial operations. For example, in one well known prior art process, a cold aqueous solution of sodium nitrite is added in its entirety to a solution of the o-phenylenediamine in aqueous acetic acid, also precooled to a low temperature of about 5° C., to form the diazonium salt. A vigorous reaction ensues with the attendant temperature rising rapidly to the order of about 80° C. permitting completion of the second step, or cyclization, to produce the desired benzotriazole. The crude, tan-colored product, which separates on cooling, is filtered, washed and dried, and then distilled in vacuo to obtain about an 80 percent yield of a yellowish solid which is then further purified by crystallization from an organic solvent such as benzene. This prior art process suffers from a number of disadvantages, the principal one of which is the difficulty in controlling the reaction on a larger scale when carried out in this manner in view of its highly exothermic nature. Such a process is therefore unsuitable for commercial utilization.

It has now been discovered, however, that the disadvantages of the prior processes can be avoided and, moreover, improved yields of highly pure benzotriazole obtained by conducting the reaction entirely at elevated temperature within the range of from about 50° C. to reflux in an aqueous acidic medium. The commercial preparation of this product is thereby facilitated inasmuch as the reactants may be contacted in a readily controllable procedure when so conducted at elevated temperatures such as by gradually adding the sodium nitrite solution to the o-phenylenediamine. This is in contrast to the prior art procedures where it was apparently considered necessary either to add all of the sodium nitrite quickly at low temperature or to maintain a low temperature throughout the addition of the sodium nitrite before raising the temperature to accomplish the second or cyclization phase of the reaction. This departure from the procedures of the prior art unexpectedly results in the production of unusually high yields of about 90 percent of theory of highly pure benzotriazole, eliminates the need for refrigeration to control the reaction, and permits the ready separation and recovery of the reaction product by such commercially desirable and convenient methods as solvent extraction and distillation.

Accordingly, it is an object of this invention to provide an improved process for preparing benzotriazole. Another object is to provide a process for preparing benzotriazole adaptable to industrial scale which involves a greater ease and economy of operation with an attendant recovery of greater yields of highly pure product. Other objects of this invention will become apparent from the following further detailed description thereof.

As hereinbefore set forth, it has now been discovered that benzotriazole may be prepared in a relatively simplified manner in high purity and with improved yields up to about 95 percent of theory by effecting the reaction at relatively elevated temperatures of from about 50° to reflux at about 100° C. in the presence of an aqueous acidic medium. By utilizing the higher reaction temperature and gradual contacting of the reactants, it is possible to readily control the reaction without extensive refrigeration. Moreover, the product obtained according to the process of this invention may be readily isolated by extracting the reaction mixture with a water immiscible alcohol such as the isomeric butanols, pentanols, hexanols, or heptanols, followed by distillation of the extract in vacuo to recover a highly pure product. Inasmuch as it is desirable to effect such distillation in a manner so as to minimize any possible hazard of explosion, it is contemplated that the distillation be conducted in a continuous manner on an industrial scale.

The aqueous acidic medium used in the reaction may be obtained by the use of an organic acid such as formic, acetic, or propionic, of which acetic acid is preferred. Contrary to the teachings of the prior art, mineral acids may not generally be substituted for the above organic acids under the elevated temperature conditions of this invention. It has been found, however, that sulfuric acid may be employed in a modification of the process which comprises using sulfuric acid in combination with about a 0.1 to 0.2 mol proportion of an alkali metal salt of the above organic acids such as sodium acetate or potassium acetate, and by adding sulfuric acid to the o-phenylenediamine suspended in the nitrite solution. The alkali metal salts of the organic acids may either be added to the reaction mixture as such or produced in situ by a number of methods which are hereinafter illustrated. While sulfuric acid may be used with highly satisfactory results in the process of this invention according to the above procedural modification, hydrochloric acid fails to give acceptable results. The nitrite solution employed in the process preferably comprises an aqueous solution of sodium nitrite, but other alkali metal nitrites such as potassium or lithium nitrites may also be used.

The process of this invention may be effected in any suitable manner and may comprise either a batch or continuous type operation. For example, when a batch type operation is used, a quantity of o-phenylenediamine and water containing, if desired, an oxidation inhibitor such as sodium dithionite is placed in a reaction vessel. Following this the vessel and contents thereof are heated to a temperature of from about 50° up to about 100° or to reflux and the acidifying agent comprising the organic acids, such as acetic acid, is added thereto. Alternately, the o-phenylenediamine is dissolved in an aqueous solution of the desired acid and thereafter heated to the desired reaction temperature. The resulting solution is maintained at this elevated temperature while a solution of sodium nitrite dissolved in water is slowly added thereto for a period of time ranging from 0.5 to about 2 hours, or more if desired. The mixture is then heated for an additional period of time to assure completion of the reaction. In a further mode of conducting the reaction, the o-phenylenediamine is suspended in the sodium nitrite solution and the acid slowly added thereto at the desired temperature. The product is then extracted from the reaction mixture with a water immiscible alcohol such as butyl or amyl alcohol, the extract then being subjected to distillation under reduced pressure whereby the desired product comprising 1,2,3-benzotriazole is separated and recovered. As hereinbefore set forth, it is also contemplated with the scope of this invention that sulfuric acid may also be utilized as the acidifying agent in a modified procedure. When utilizing sulfuric acid as the acidifying agent, the o-phenylenediamine is suspended in a sodium nitrite solution containing about 10 to 20 mole percent of sodium acetate following which the sulfuric acid is gradually added to the solution. The sodium acetate may also be formed in situ by initially adding 10 to 20 mole percent of acetic acid. Alternately, the o-phenylenediamine may be suspended in a water solution containing about 10 to 20 mole percent of sodium acetate while the sodium nitrite solution and the sulfuric acid are simultaneously added gradually in separate streams with constant stirring.

It is also contemplated within the scope of this invention that o-phenylenediamines which contain substituents such as alkyl, alkoxy, halo and aryl radicals may also be treated in a similar manner to produce the corresponding substituted 1,2,3-benzotriazoles.

The following examples are given to illustrate the process of the present invention which, however, are not intended to limit the generally broad scope of the present invention in strict accordance therewith.

*Example I*

108 grams (1.0 mole) of o-phenylenediamine, 300 grams of water and 1.0 gram of sodium dithionite were placed in a reaction vessel which was then heated to a temperature of about 55° to 60° C. with constant stirring. Following this 72.0 grams (1.2 moles) of glacial acetic acid were added during a period of about 10 minutes. A solution of 75.0 grams (1.09 moles) of sodium nitrite in 100 grams of water was then added dropwise during a period of about 0.5 hour while the temperature of the solution was maintained at the above range. Upon completion of the addition of the sodium nitrite the mixture was maintained at a temperature in the range of from about 55° to 60° C. for an additional 0.5 hour following which the temperature was increased to about 75° C. during a period of 0.5 hour. At the end of this time the mixture was cooled to a temperature of about 65° C. and 250 grams of mixed amyl alcohols known under the trade name of Pentasol was added. The solution was stirred and separated at a temperature of about 50° C. The oil layer was washed with 250 grams of a 10% salt solution and separated. The reaction waters were then re-extracted with an additional amount of 125 grams of Pentasol and the extractions were used to extract out the previous salt wash. The oils resulting from the extractions were then combined and subjected to distillation under reduced pressure. After recovering the solvent, a fraction boiling at 157° to 170° C. at 2 mm. pressure was separated and recovered. The material crystallized on cooling. The crystals which were practically colorless had a melting point of 98° C., said fraction representing a 96% yield of theory. When this material was admixed with a sample of benzotriazole obtained from an outside source, the mixed melting point showed no depression.

*Example II*

In this example sulfuric acid was used as the acidifying agent in place of the acetic acid utilized in Example I above. A mixture of 108 grams (1.0 mole) of o-phenylenediamine, 300 grams of water, 12 grams of glacial acetic acid and 4 grams of sodium hydroxide was placed in a reaction apparatus. The mixture was heated to a temperature of 55° C. and maintained in a range of 55° to 60° C. while simultaneously slowly adding during a period of 1 hour 1.05 equivalents of a 25% sulfuric acid solution and 75 grams (1.09 moles) of sodium nitrite dissolved in 100 cc. of water. The temperature of the reaction mixture was maintained in the aforementioned range for an additional period of 0.5 hour and then increased to about 75° C. Upon completion of the desired residence time the mixture was cooled to about 65° C. and treated in a manner similar to that hereinbefore set forth, that is, by extraction with an amyl alcohol mixture, washing with a saline solution, re-extraction with an amyl alcohol mixture and distillation under reduced pressure. A desired product comprising 1,2,3-benzotriazole with a melting point of 98° C. was recovered from the distillation in a 94% yield.

*Example III*

In this example sulfuric acid was also used as the acidifying agent. A mixture of 108 grams (1.0 moles) of o-phenylenediamine, 75 grams (1.09 moles) of sodium nitrite and 300 grams of water was placed in a reaction apparatus and heated to a temperature in the range of from about 55° to 60° C. Following this 12 grams (0.2 mole) of glacial acetic acid was added dropwise followed by the addition of 1.0 equivalent of a 50% sulfuric acid solution during 0.5 hour. The resulting mixture was treated in a manner similar to that in Example I above and the desired product comprising 1,2,3-benzotriazole with a melting point of 98° C. was recovered in a 94.5% yield.

*Example IV*

In this experiment a run similar to that set forth in Example I above was made, the only difference in technique being that the reaction was effected at reflux temperature (i.e., 100° to 104° C.), all other conditions being equal. The product was isolated in a 92.5% yield of the theoretical, said product (1,2,3-benzotriazole) having a melting point of 96° to 97° C.

*Example V*

An attempt was made to use hydrochloric acid as an acidifying agent in place of the sulfuric acid or acetic acid as used in the above examples. However, the attempted process was unsuccessful due to the formation of tarry insoluble material which was accompanied by nitrous acid fumes during the reaction.

I claim as my invention:

1. In the method of producing a benzotriazole by reacting an o-phenylenediamine with an alkali metal nitrite in an aqueous acidic medium initially at a low temperature in the range of from about 0° to 5° C., and finally at a higher temperature above about 50° C., the improvement which comprises carrying out the reaction entirely at elevated temperature within the range of from about 50° C. to about reflux and in an aqueous acidic medium comprising an aqueous solution of an acid selected from the group consisting of formic, acetic and propionic acids and sulfuric acid in combination with an alkali metal salt of the aforesaid organic acids.

2. The process of claim 1 wherein o-phenylenediamine is reacted with sodium nitrite in aqueous acetic acid to produce benzotriazole.

3. The process of claim 1 wherein an alkali metal nitrite and an o-phenylenediamine are brought into reactive contact by gradually adding the nitrite in aqueous solution to the o-phenylenediamine in an aqueous solution of an acid selected from formic, acetic and propionic acids.

4. The process of claim 1 wherein sodium nitrite and o-phenylenediamine are brought into reactive contact by gradually adding the nitrite in aqueous solution to the o-phenylenediamine in aqueous acetic acid.

5. The process of claim 1 wherein the reaction is effected by gradually adding aqueous sulfuric acid to a mixture of o-phenylenediamine and an aqueous solution of sodium nitrite containing sodium acetate dissolved therein.

6. The process of claim 1 wherein sodium nitrite and o-phenylenediamine are brought into reactive contact by gradually adding simultaneously in separate streams aqueous sulfuric acid and the sodium nitrite in an aqueous solution to a mixture of the o-phenylenediamine in water containing sodium acetate dissolved therein.

No references cited.

NICHOLAS S. RIZZO, *Primary Examiner*.